(12) United States Patent
Gutierrez

(10) Patent No.: US 6,643,579 B1
(45) Date of Patent: Nov. 4, 2003

(54) SYSTEM AND METHOD FOR AIRCRAFT AND WATERCRAFT CONTROL AND COLLISION PREVENTION

(76) Inventor: William Gutierrez, 3426 S. Oxford Ave., Independence, MO (US) 64052

( * ) Notice: Subject to any disclaimer, the term of this patent is extended or adjusted under 35 U.S.C. 154(b) by 0 days.

(21) Appl. No.: 10/237,908

(22) Filed: Sep. 6, 2002

Related U.S. Application Data

(63) Continuation of application No. 09/992,829, filed on Nov. 14, 2001, now Pat. No. 6,456,941.
(60) Provisional application No. 60/278,327, filed on Mar. 26, 2001.

(51) Int. Cl.[7] .............................................. G06F 17/00
(52) U.S. Cl. ...................... 701/117; 701/120; 701/301
(58) Field of Search ................................ 701/301, 213, 701/215, 214, 216, 300, 307, 117, 120, 122

(56) References Cited

U.S. PATENT DOCUMENTS

| | | | |
|---|---|---|---|
| 5,200,902 A | 4/1993 | Pilley | 364/439 |
| 5,381,338 A | 1/1995 | Wysocki et al. | 364/449 |
| 5,493,309 A | 2/1996 | Bjornholt | 701/301 |
| 5,574,648 A | 11/1996 | Pilley | 364/439 |
| 5,872,526 A | 2/1999 | Tognazzini | 340/961 |
| 5,884,219 A | 3/1999 | Curtwright et al. | 701/213 |
| 5,890,079 A | 3/1999 | Levine | 701/301 |
| 5,948,043 A | 9/1999 | Mathis | 701/208 |
| 5,991,690 A | 11/1999 | Murphy | 701/211 |
| 6,182,005 B1 | 1/2001 | Pilley et al. | 701/120 |

*Primary Examiner*—Richard M. Camby
(74) *Attorney, Agent, or Firm*—Clifford Kraft

(57) ABSTRACT

A system for navigation and collision avoidance where aircraft and vessels determine their position by GPS and report that position to a system of satellites along with local parameters such as heading and attitude. This system of satellites allows communication and exchange of information between all the satellites. Each participating craft receives from at least one of these satellites the positions, headings, speed and other parameters of all craft in the system or of all craft in the vicinity. A display can display a situation or a view located on any craft in the system (but normally on the craft where it is located) to inform o hazards and pending collisions. Icons and craft information appear for all craft being displayed.

16 Claims, 8 Drawing Sheets ns is a continuation of application Ser. No.
SYSTEM AND METHOD FOR AIRCRAFT AND WATERCRAFT CONTROL AND COLLISION PREVENTION This application is a continuation of application Ser. No. 09/992,829 filed Nov. 14, 2001 now Pat. No. 6,456,941. That application claimed priority from provisional application No. 60/278,327 filed Mar. 26, 2001. Provisional application No. 60/278,327 is hereby incorporated by reference.

BACKGROUND

1. Field of the Invention

The present invention relates generally to the field of craft control, navigation, and collision prevention, and more particularly to a system and method of relaying craft position information derived by GPS via satellites to other participating craft to prevent collisions and inform the pilot or captain of possible procedures to follow.

2. Description of Related Art

The use of GPS positioning is well known in the art for all types of aircraft, watercraft, and land vehicles. Local systems exist where vehicles broadcast this information to other vehicles or craft in the vicinity (see for example U.S. Pat. No. 5,872,526). However, these systems do not provide location information that is available on a world-wide basis to participating users. Users must be within receiving distance of the cooperating aircraft or watercraft to receive reports.

U.S. Pat. No. 5,995,903 uses real world terrain depiction. GPS position is used to find the correct point in a terrain database.

There are many other prior art systems that use GPS for navigation and many proposals to improve the air traffic control system; however, none of these systems or proposals address the real problem of knowing where each craft in the system is and being able to report that to all other craft and then supplying information to the pilot or captain as to what to do in a certain situation.

What is badly needed is a system and method where position, course, speed, and altitude information (for ships, position, speed, and course) can be transmitted to satellites specifically designed to control such traffic on a world-wide or nation-wide basis. These satellites should communicate with each other so that all satellites can rebroadcast all available information. This way participating craft are always aware of the location of all other craft known about by the system. This system should inform the pilot or captain of collision hazards and provide information as to what to do in a given situation.

SUMMARY OF THE INVENTION

The POSTMAN/D (Positioning by Orbital Satellite Transmitting Marine and Aviation Navigational Data) system, that represents the present invention, is an integrated cockpit/bridge communications system that takes data known to each craft and provides it to other participating craft. By craft, I mean aircraft and watercraft of all types, missiles, and also optionally land vehicles.

The system of the present invention supplies a visual display of all craft in the area. Each participating craft computes its position in known ways via GPS/DGPS, or other possible ways such as Loran C, VOR, or any other means or method of determining absolute position. The preferred method is the use of GPS or DGPS known in the art. Each craft also possesses information on its own speed, heading, absolute altitude, and height above the ground for aircraft, as well as its attitude in terms of pitch, roll, and yaw. Generally three GPS satellites are needed for an a 3-dimensional fix.

Each participating craft can then uplink transmit this information via microwave link to at least one of a special constellation of POSTMAN/D satellites dedicated to this system. These satellites, located strategically around the world, communicate with each other via microwave or other communications means. In this manner, they share information concerning all participating craft.

Each participating craft also receives a downlink transmission of a broadcast nature from all POSTMAN/D satellites in its view. It is thus possible for any participating craft to have detailed, real time information of any other craft actively in the system.

Each craft is identified to the system by a unique serial number or hull number. This number can be programmed into the system at installation time and cannot be changed. Thus, whenever the on-board system is transmitting coordinate information, it is always using the correct, unchangeable hull or serial number of the craft. By coordinate information, I mean position, speed, heading, altitude, and height above the terrain. Thus, it is difficult, if not impossible, to fool the system into misidentification of any craft.

Thus, it is an object of the present invention to provide a system where each participating craft reports its position as determined from GPS, and its own parameters such as heading and speed to a system of repeaters which are satellites or other control points. The satellites are in communication with each other so information available at one satellite is available at every satellite. Each participating craft in the system receives information on location, heading, and speed of other craft. It can then display the status of other craft on a display; it can warn of impending collisions; and it can even be programmed to avoid collisions by supplying information to a craft's autopilot.

Software in an on-board computer system correlates and classifies all data coming in from the POSTMAN/D satellites as to coordinates of other craft as well as coordinates for the that craft. Computations can be easily made to determine if there is any collision danger. A zone of protection can be computed around the craft based on speed and maneuverability. The system can provide the pilot or captain with instructions on what to do to avoid any potential collision or in any other situation. The system can optionally be programmed to take control of the craft to perform emergency maneuvers to avoid collision by sending data to the craft's autopilot.

The basic on-board system can consist of a GPS/DGPS receiver, a microwave transceiver for communication with the POSTMAN/D satellites, an UHF transceiver for backup or local communication, a gyro stabilized antenna with a signal seeking device to lock on the best POSTMAN/D satellite, a display panel for the cockpit or bridge, and various interface equipment between the components. In addition, the basic system has inputs from the craft's own instrument systems as to attitude roll and pitch (or heading in the case of a ship). This allows proper positioning of Icons on a display in the proper axis or real time flight attitude. The display software can supply simulated terrain or scenery similar to that of a flight simulator.

Once the system is activated, the stabilized antenna seeks and locks on the strongest available POSTMAN/D satellite. The system can be programmed to search for, and switch to, a stronger signal if one becomes available. The system begins immediately to transmit the craft's ID number as well as absolute position in longitude and latitude (or other local coordinates), heading, speed, and altitude. The system also begins immediately to receive data from the POSTMAN/D system of satellites concerning other participating craft anywhere. Selection can be made by ranging to limit the incoming information to craft in a reasonable vicinity. Because information is available about all participating craft, the display can be centered or located on any craft in the system, not just the craft where the display is located. When the display is located on another craft, it shows all information relative to that craft.

Data to and from the POSTMAN/D satellites is generally in a data packet module format using the known techniques of digital data transmission. Each packet or module can contain error control bits and/or error correction capabilities. Any received packet or module that cannot be read for any reason can be re-requested. Data from the satellites is generally sent out in a broadcast mode to all craft in receiving range. Data to the satellite from any craft can be sent in a packet/collision communications mode known in the art, or by any other communications mode that allows multiple competing stations to communicate including time division, frequency division and code division multiplex.

The system can also be used to control or guide aircraft on the ground to guide them to proper destinations on an airport and to prevent ground collisions (either between aircraft or aircraft and vehicles). In this case, airport vehicles would also be participating craft in the system.

Alternate communication between local vehicles or in the case of bad weather could be by UHF radio. UHF could be used anytime that microwaves did not work. The POSTMAN/D satellites can optionally be used in conjunction with fixed ground stations set up along coastlines. These stations would act as repeaters communicating with the satellites via microwave and with craft by UHF if necessary.

The system can also be optionally programmed to provide instructions according to the rules of the road for vessels. This feature would be especially useful for inexperienced boaters faced with a possible collision hazard or if they wander into shallow or unsafe water.

The system for aircraft can, and should, have the feature of not being able to be turned off while the aircraft is in flight. This can be simply accomplished by providing input from switches sensing the landing gear down and with weight on the gear. This feature would allow operators anywhere to determine the location of any aircraft at all times even in situations where terrorists, for example, did not want the aircraft's position to be known (for example by turning off the transponder). In addition, if there is such a change in course that an aircraft has totally deviated from its original flight plan, an emergency code can be sent to the satellite to declare an abnormal or emergency situation. Sometimes aircraft are asked to circle locations to "hold" while in flight. The system could be programmed to recognize such a maneuver and not declare that an emergency. This could be done by recognizing that the aircraft is holding at a known navigation point. Also the aircraft could inform the system that it is holding.

The craft's display will show all craft utilizing the system (in the selected range), and those not in the system but detected by any participating craft's radar system. It can show an icon depicting the craft (model, color, logos, and similar identification information) as well as the craft's serial number, the country of registration flag (to help controllers with choosing a secondary language for instructions if needed), the craft's itinerary, the captain's name, and the name of the owner or company. The information, other than the icon and serial number, need not be displayed on the display, but can be accessible by inquiry and can appear at the bottom of the screen, or elsewhere, in an area near the craft's instruments being monitored by the POSTMAN/D system.

On the bottom of the screen, or elsewhere, a number of the craft's instruments can be shown on a rotating basis, (unless they fall out of normal range reading and require immediate attention, at which time they will appear steady and oversize).

Thus it is an object of the present invention to control air traffic by self-reporting users worldwide.

It is an object of the present invention to provide positive identification of all traffic and its destination.

It is an object of the present invention to eliminate misinterpretation of commands caused by language barriers by providing secondary language reporting in any language.

It is an object of the present invention to optionally make use of a craft's autopilot to navigate the craft safely to its destination.

It is an object of the present invention to also report craft not self-reporting when they are picked up by other participating craft.

It is an object of the present invention to allow an operator to visually watch traffic at any given point on earth limited only by software installed on his craft.

It is an object of the present invention to control air ground traffic much like automobile traffic.

It is an object of the present invention to provide collision deterrence by warning all concerned of impending danger long before anything happens.

It is an object of the present invention to pinpoint the exact location and details of all craft when an emergency situation develops.

It is an object of the present invention to provide expert guidance as to actions that should be taken by a pilot or captain to avoid a collision or other danger.

It is an object of the present invention to provide a deterrence against unlawful use of a craft by anyone.

It is an object of the present invention to be available to all craft large and small by secondary UHF communications.

It is an object of the present invention to provide field guidance of a tactical weapon such as a missile from anywhere in the world.

It is an object of the present invention to provide a means where aircraft pilots can see their position in relation to waypoints in route to a final destination.

It is an object of the present invention to allow ground controllers to track the position of aircraft at airport facilities using icons on a control display.

DETAILED DESCRIPTION

Figure 1:
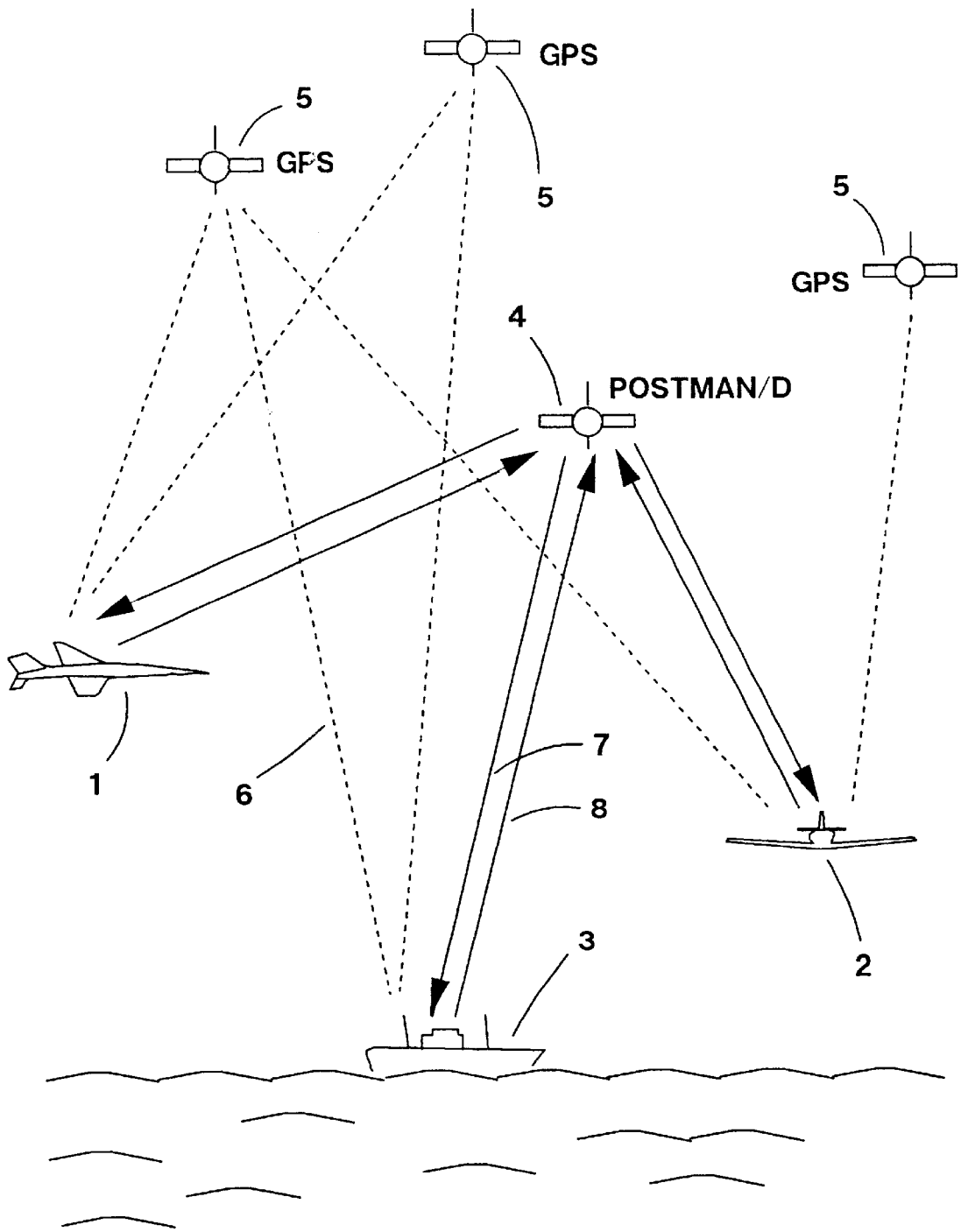
FIG. 1 shows a diagram of the POSTMAN/D system with communications between craft and satellites.

Turning to FIG. 1, an overview of the POSTMAN/D system can be seen. Various craft such as ships 3, high performance aircraft 1, low to medium performance aircraft 2, missiles (not shown), helicopters (not shown), and any other sort of craft including some land vehicles (not shown) communicate bidirectionally with one or more POSTMAN/D satellites 4. In addition, each craft computes absolute position, speed over the ground, and possibly altitude by receiving microwave signals from GPS satellites 5. Usually 3 GPS satellites must be acquired to determine these parameters accurately. The use of GPS is well known in the art.

Each craft uses the signal from the GPS satellite 6 to compute its own parameters or coordinates. These coordinates (meaning position, speed, and possibly altitude) are combined with locally known parameters such as heading, helm setting and engine setting for a watercraft, or pitch and roll angle for an aircraft to form a complete set of such parameters or coordinates which are then transmitted to the acquired POSTMAN/D satellite by a dedicated uplink microwave channel 8 channel. This channel can use any convenient microwave frequency that would be assigned to it. It is within the scope of the present invention to use different frequency sets or channels for ships, aircraft, ground control, and missile or remote control. Any type of modulation can be used including amplitude modulation, frequency modulation, and phase modulation. Digital signaling techniques known in the art are used for this communication. A preferred method is to use code division multiplexing; however other forms of multiplexing can also be used such as time division multiplexing and frequency division multiplexing.

Each larger craft can use a gyro stabilized antennal locked to the POSTMAN/D satellite that is received with the strongest signal. It is also within the scope of the present invention to use a phase steered antenna that has no moving parts. The advantage of a phase steered antenna is that it can spend part of its time search the sky for a POSTMAN/D satellite with a stronger signal without losing lock of the current acquired satellite.

The POSTMAN/D satellite 4 sends signals back to the craft using a downlink microwave communications channel 7 that functions similarly to the uplink channel 8.

Figure 2:
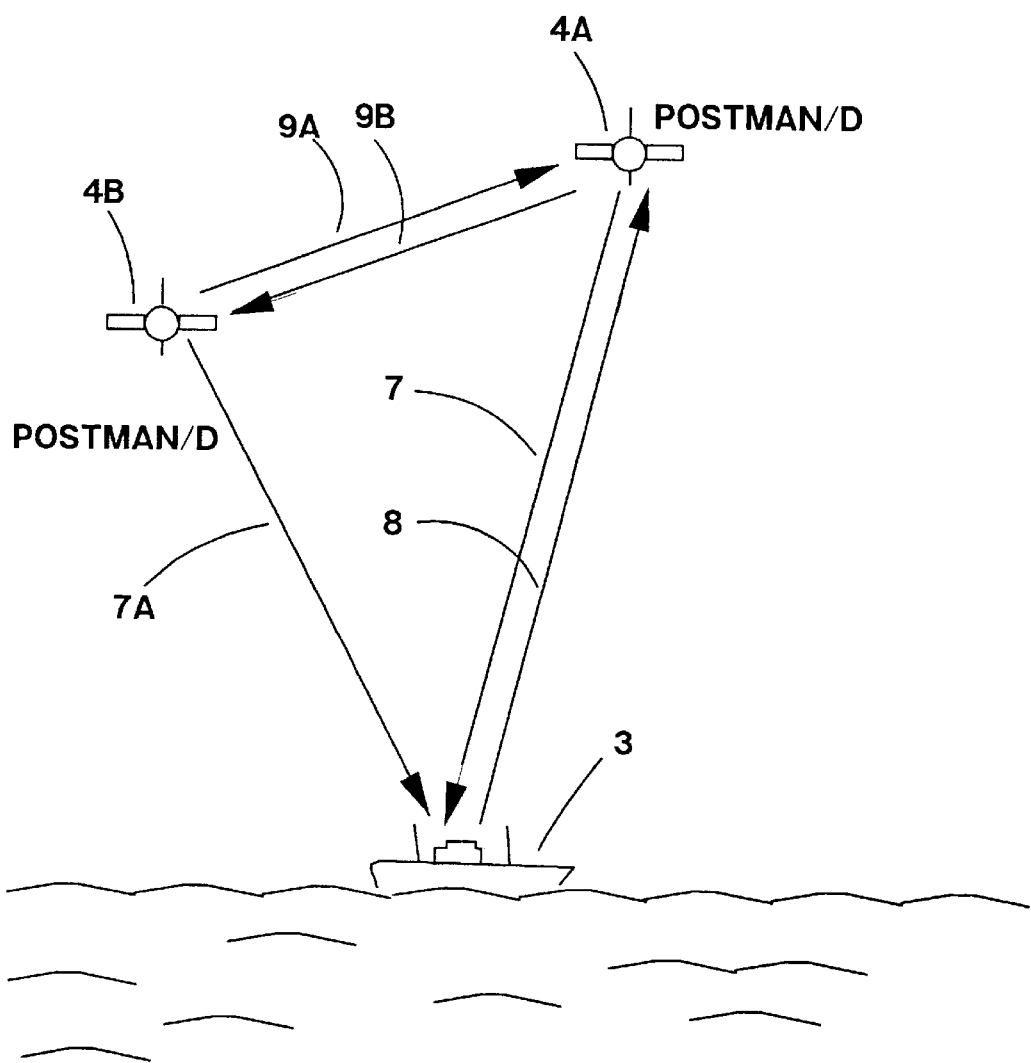
FIG. 2 shows satellite to satellite communication.

FIG. 2 shows two POSTMAN/D satellites 4A and 4B communicating with each other. POSTMAN/D satellites that are within visual range of each other can acquire and communicate with each other. This way, data from all participating craft can be shared among all POSTMAN/D satellites. Each satellite can optionally maintain an on-board database of all participating craft activity. This data can be compressed for efficient storage. The total number of craft operating world-wide can number in the thousands or tens of thousands. Microwave relay of packetized messages can update this data rapidly and keep it up to date. Data concerning high performance aircraft and missiles must be updated very rapidly, while data concerning low performance aircraft and ships can be updated at a lower rate.

In FIG. 2, the two satellites use separate channels for 9A and 9B for fast exchange of information. FIG. 2 also shows the uplink and downlink channels 7 and 8 to a vessel 3 previously discussed as well as a secondary downlink channel 7A which could be optionally acquired by a craft if desired. This second channel from a different POSTMAN/D channel would serve as a verification and backup communications means.

Figure 3:
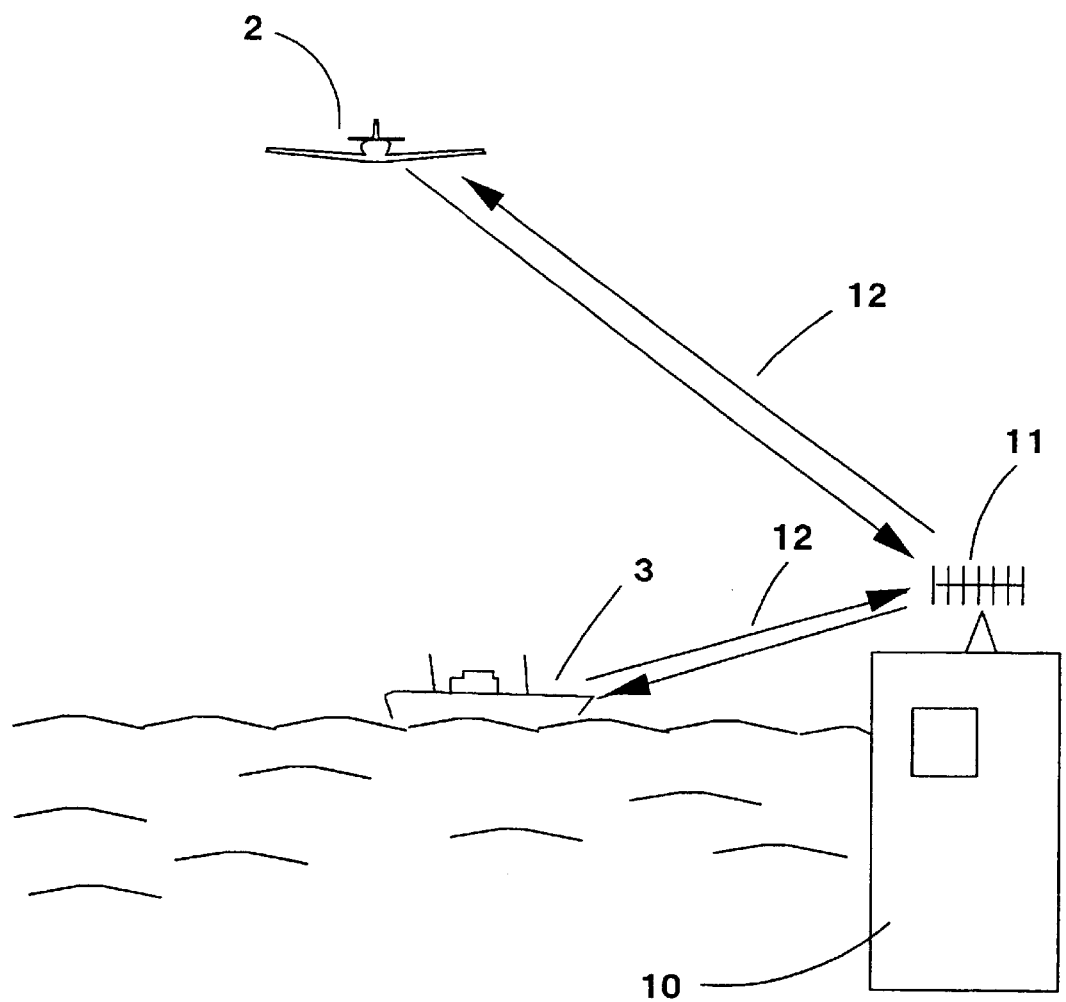
FIG. 3 shows UHF backup communications.

FIG. 3 shows ultra-high frequency (UHF) radio backup. The present invention includes the optional capability for craft of all types to communicate by UHF radio with fixed land (or sea) stations 10. In FIG. 3, an aircraft 2 and a ship 3 can communicate directly with a UHF antenna 11 located at the station 10. A slower, by similar uplink/downlink channel pair 12 is also used. Not shown in FIG. 2 is the fact that the fixed station 10 also communicates with one or more POSTMAN/D satellites. The fixed station thus can also have an updated data base of all participating craft, or it can simply be a relay station. UHF communication can then be used in situations where a craft simply cannot communicate by microwave directly with a POSTMAN/D satellite because of weather or other reasons. Also, small craft are more likely to use UHF into a fixed station because they are usually within easy communications distance from shore, and they may not be able to afford the costs of a more sophisticated gyro-stabilized or phase steered antenna system. Aircraft taking off and landing generally use UHF communications while they are near the airport. In the case of UHF communications, the fixed station can act as if it were one of the POSTMAN/D satellites in that it could contain an active database and relay craft coordinates to the satellite constellations.

Figure 4:
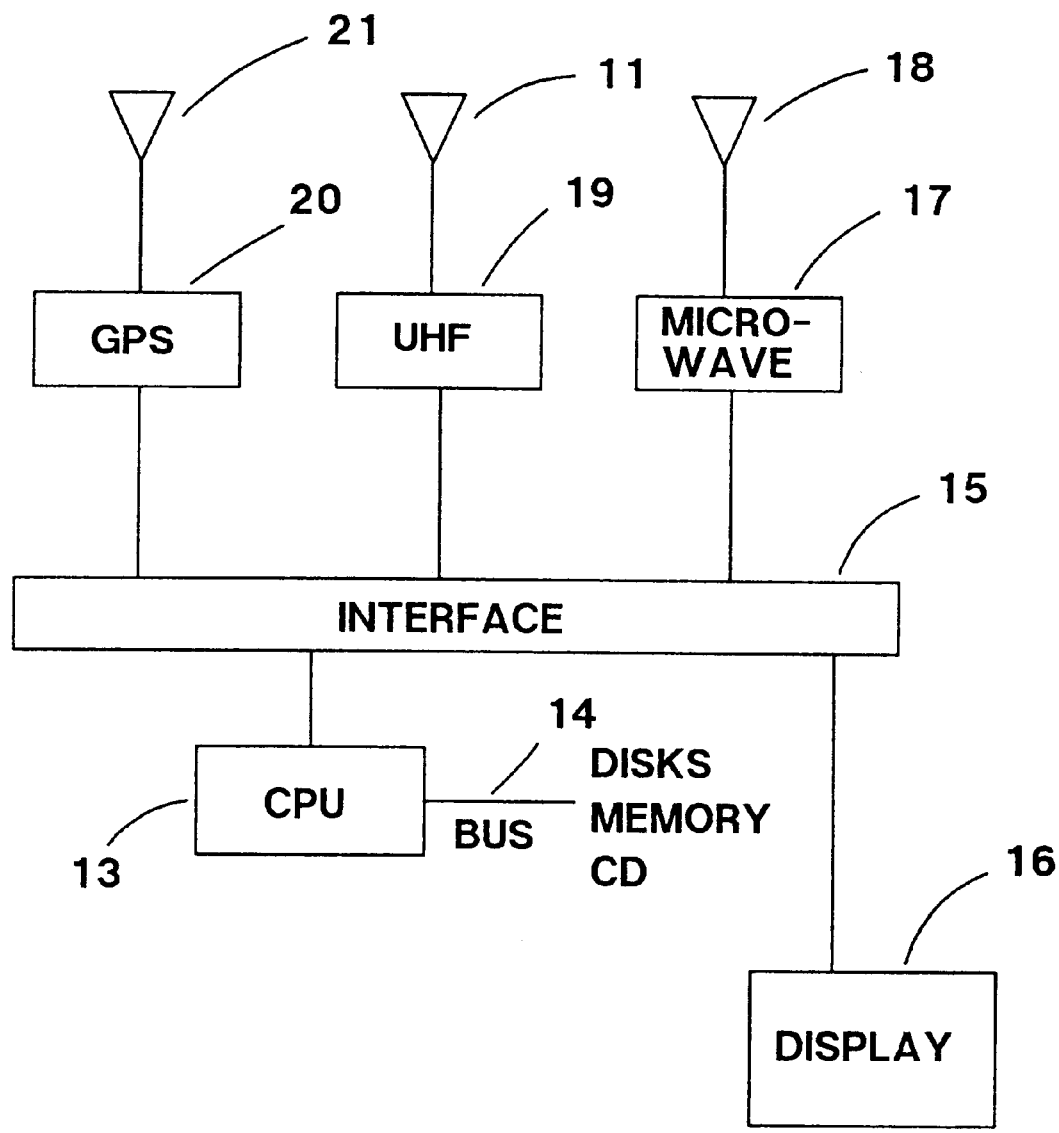
FIG. 4 is a block diagram of a basic system.

FIG. 4 shows a block diagram of an embodiment of an on-board system. Three antennas are shown in FIG. 2, normal GPS receive 21, UHF transmit/receive 11 and microwave transmit receive 18. Each antenna has an associated receiver: GPS 20, UHF 19 and microwave 17. As discussed, the microwave antenna 18 is either gyro stabilized or phase steered to maintain satellite lock (any other means of locking the antenna on a satellite is within the scope of the present invention). In normal operation, for an aircraft system, upon touchdown, the pilot would switch from "flight mode" to "ground mode". This will generally cause the computer to switch transceivers, UHF becoming the active and microwave becoming the standby. This allows ground controllers to take over control of traffic.

An interface system 15 takes demodulated and decoded data (possibly error corrected) and provides input to a central processing unit (CPU) 13. The CPU communicates with disks, memory, CD ROM and other peripherals as is well known in the art of computing. In addition, the CPU 13 communicates with a special display 16 that presents information to the pilot or captain and allows incoming commands to be displayed or directly coupled into an autopilot. A pointing device can also be attached so that various information can be displayed.

The craft's hull number or serial number is hard programmed into the POSTMAN system at installation and cannot be changed in the field. Support information such as country of registration, year of manufacture, manufacturer's name, model, and serial number can also be hard programmed. This data is used to generate a craft ID that is used throughout the system to identify that craft to all other craft.

The display 16 can display simulated terrain data as well as situation data. Usually horizontal situation data is preferred; however, the display can be changed to show vertical data as well. For marine vessels, a marine navigation chart can be superimposed on the display. For aircraft, various air navigation charts can be superimposed if desired. The overall scale can cover selected ranges such as 5 miles, 25 miles, 60 miles, and any other range. Ranges can also be selected by latitude and longitude coordinates. As mentioned, the display can be centered or located on any craft in the system and not just the craft where the display is located. This feature could be used when some craft was having an emergency.

An icon that best depicts the type of craft appears on the display for each craft within the range that the display is set at. The display can be zoomed in and out. For aircraft, next to the icon, the tail number as well as country of registration is displayed. For ships, an identifier as well as country of registration and possibly gross weight can be displayed. Supplemental information can also be displayed such as year of manufacture, manufacturer's name, model, length, and serial number. Missiles simply have a code or serial number inserted for ease of identification.

Different views can be provided to the operator in addition to a horizontal situation view; these are front view from the cockpit or bridge, side views, top views, line of sight with the nose of the craft or missile.

The POSTMAN/D system can help with the safety and navigation of aircraft and marine vessels. The system can create an imaginary protective envelope around the craft which will warn the pilot of a possible danger or collision with another craft or fixed object. It can also provide the pilot or captain with the proper procedure or action necessary to avoid such a collision or danger.

Figure 5:
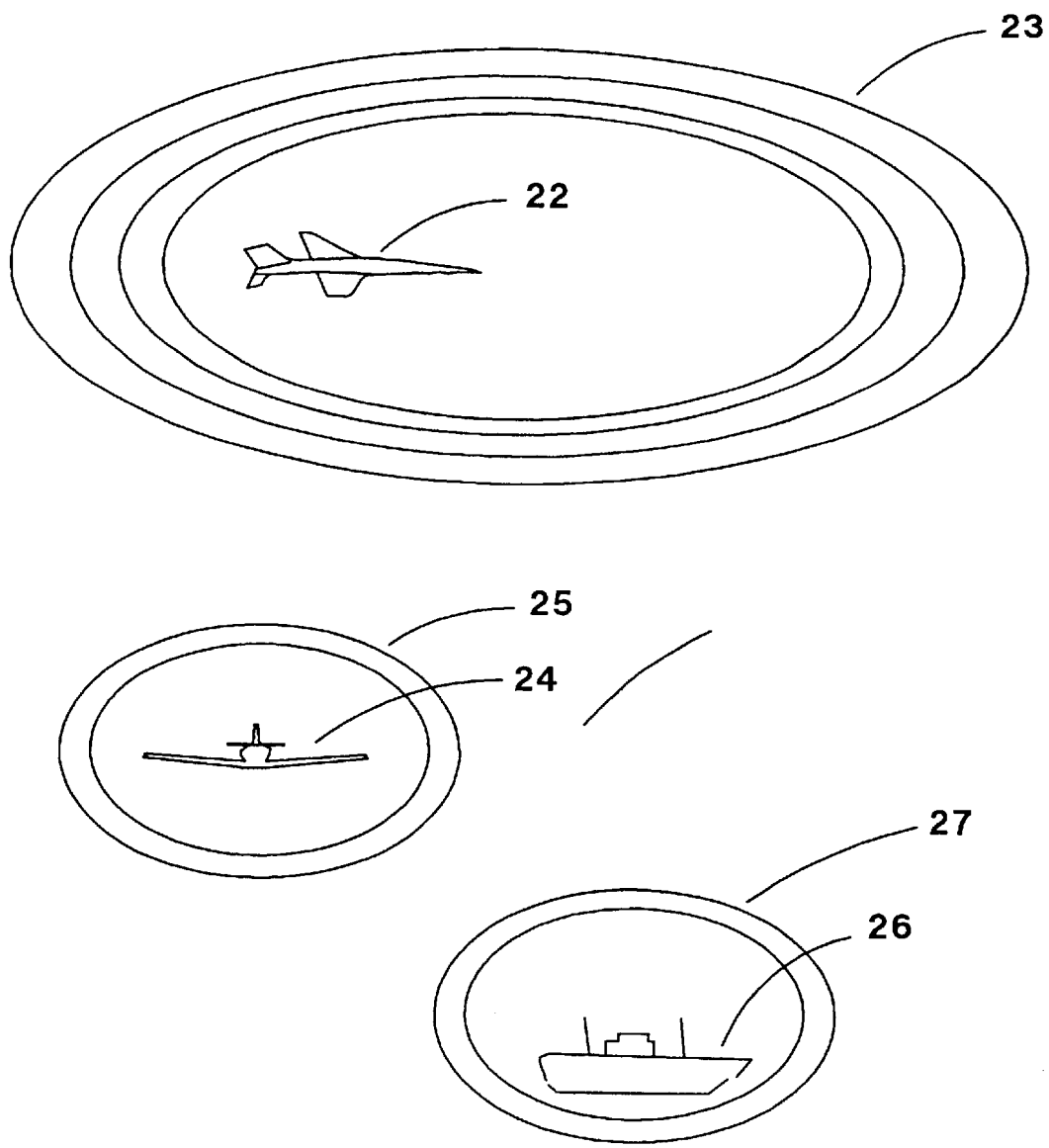
FIG. 5 shows zones of safety around various craft.

FIG. 5 shows a diagram of possible imaginary protective envelopes for various types of craft. A high performance aircraft 22 has a large envelope 23, where a low performance aircraft 24 has a much smaller envelope 25. A ship 26 has a smaller envelope fore and aft (in front of it and behind it) and to the sides. For aircraft, the standard recommended envelope is at least 1000 feet for each 100 knots of speed. The POSTMAN system can set an envelope of 5 miles from each wingtip horizontally 1500 feet vertically. Front and rear limits depend on speed; the minimum standard is 5000 feet front and 3000 feet rear. These envelopes can be changed. Any safety envelopes are within the scope of the present invention.

The system can be programmed to recognize and adjust, compare and calculate, all objects within these envelopes. For any object or craft on a collision course, the exact time to impact can be computed and reported. Programming then can provide a visual and/or audio warning at a predetermined time or range for save evasive action.

Figure 6:
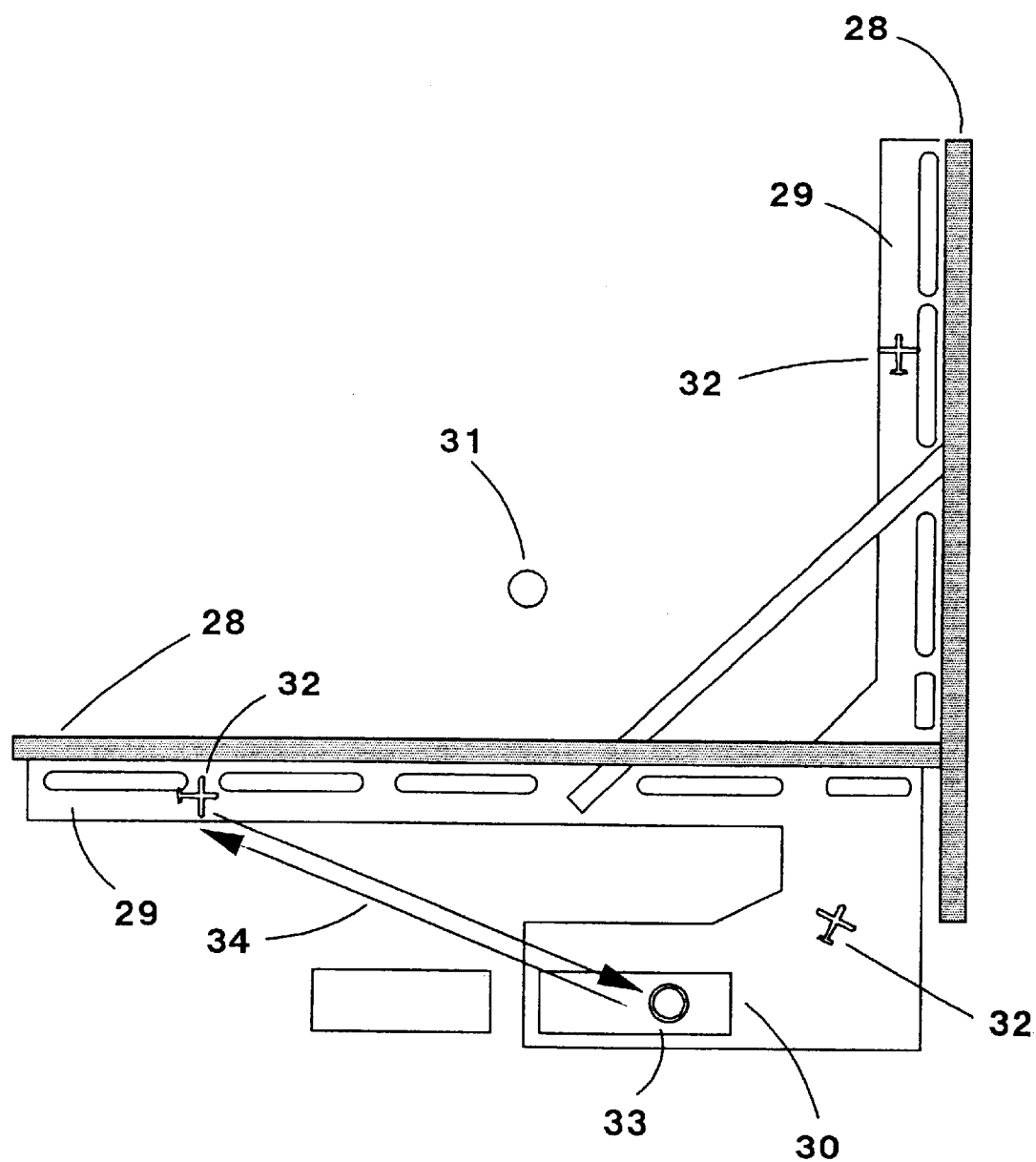
FIG. 6 shows an airport where the invention is controlling ground traffic.

FIG. 6 shows a view of a commercial airport looking down. Two major runways 28 are shown as well as taxiways 29. A control tower 31 is possibly located somewhere in proximity to the runways. Also shown is an apron 30 near a building. This could represent a passenger terminal, hanger or other airport building. Various aircraft 32 are under ground control and are on the taxiways. The aircraft's GPS determines the exact location of each craft. This information is transmitted to by UHF to an antenna 33 located somewhere on the airport This antenna is connected to a ground based POSTMAN/D station that relays information received from satellite and other aircraft. In particular there can be a UHF link 34 to each plane being controlled so that the POSTMAN/D display on each plane can show the location of all other active planes on the airport. Even airplanes on runways participate with the POSTMAN/D system to report their whereabouts to other airplanes on the airport. This is particularly effective in preventing collisions between planes landing and taking off and planes taxiing (especially when taxiing aircraft cross active runways). As previously stated, when an aircraft lands, a switch is made from satellite microwave to local UHF communications. Ground controllers can then take over control of the aircraft. The craft will appear as an icon on their display. Their display can have an airport facility depiction as a background.

Figure 7:
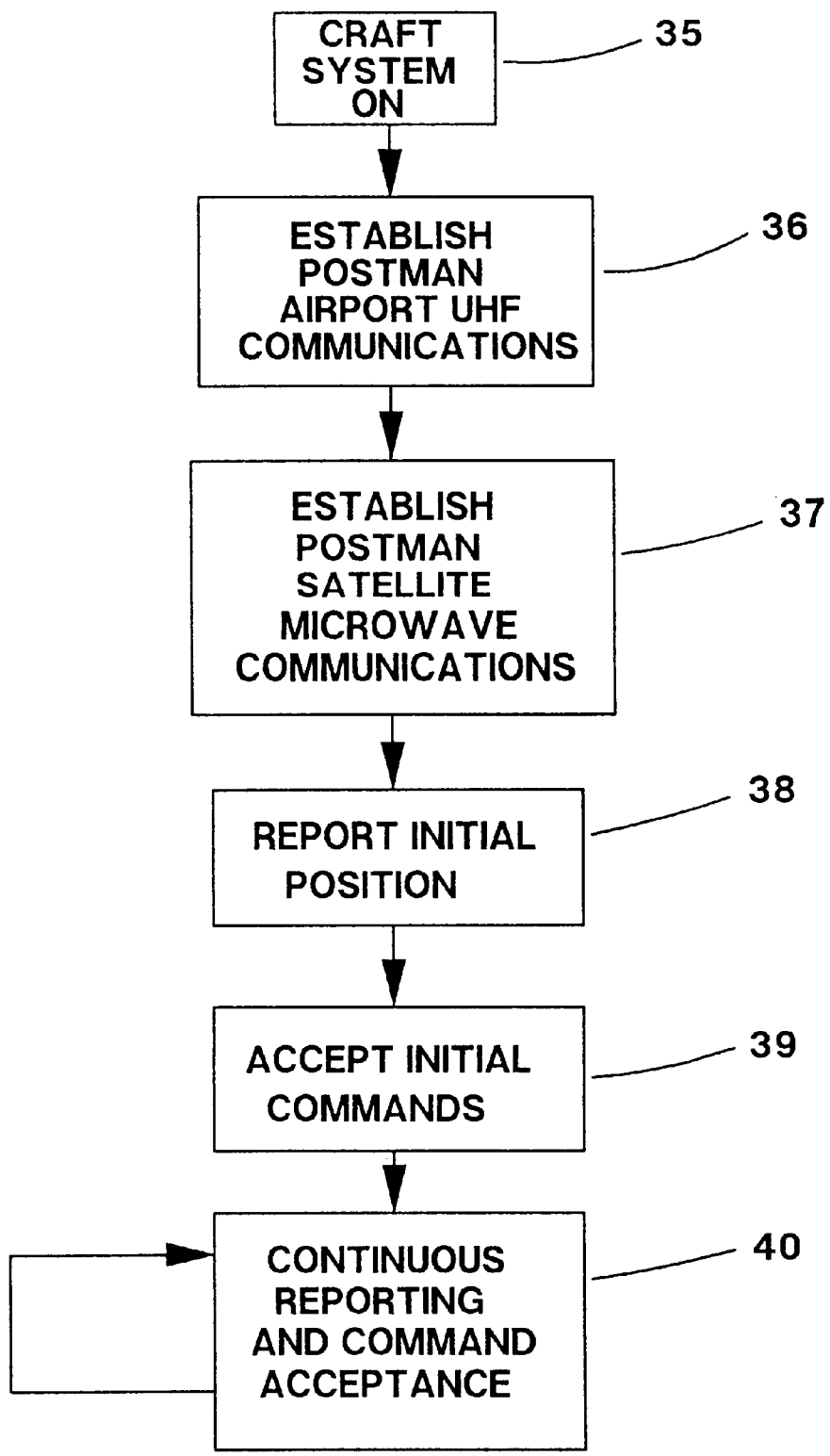
FIG. 7 shows a flowchart of the startup procedure for a craft.

FIG. 7 is a schematic diagram of the POSTMAN/D turn-on process onboard a given craft. When the craft becomes active 35, the POSTMAN/D system turns on. This can be automatic whenever the craft's engine is running. It is possible to install the POSTMAN/D system so that it cannot be turned off from inside the cockpit or bridge of a craft. This can be controlled by a variety of conditions such as engines on and landing gear up, or no weight on landing gear for aircraft. The idea is that any craft that is located in any position that could even remotely lead to a collision with other craft must be reporting its position to the other craft. Also, it should be impossible to defeat the system by anyone when the craft is in motion. Thus, even an aircraft that has been taken over or hijacked will continue to report its position.

After the system is activated 35, local communications are established 36. On an airport or in a harbor for a watercraft, this can be by UHF communications. The POSTMAN/D system next tries to establish satellite communication 37 with a POSTMAN/D satellite so that it can directly send and receive its position into the system. An initial GPS fix is also made, and the initial position of the craft is reported 38 to the system. Any possible initial commands 39 or position reports of other craft in the locality (or on the airport or in the harbor) are received and displayed. Finally, the onboard system goes into a steady state 40 of reporting position to the rest of the system and of accepting incoming reports of other craft locations and any possible incoming commands.

Figure 8:
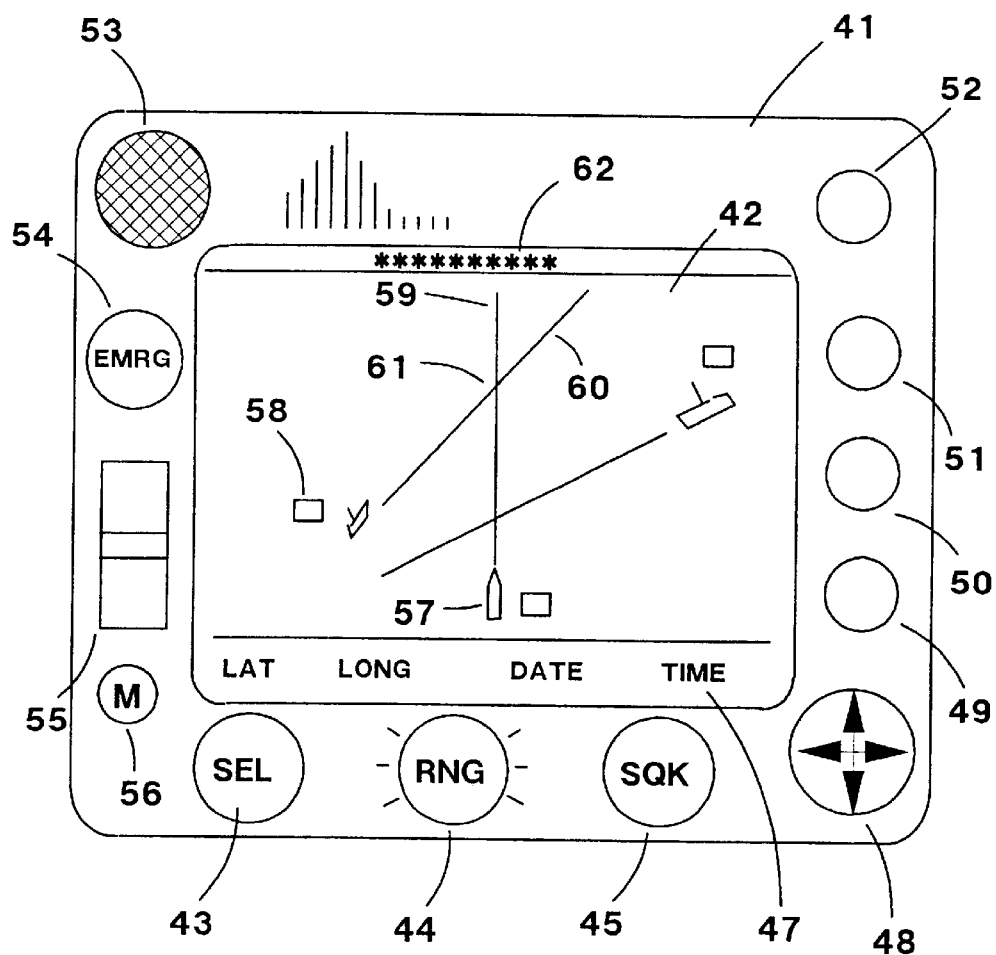
FIG. 8 shows an embodiment of a shipboard display.

FIG. 8 shows an embodiment of a shipboard display. It should be noted that this figure is simply illustrative and that many other configurations of displays could be used. A display screen 42 shows a plot of the current situation. This situation can be chosen to be from above (as shown), out the window, from the side, or any other possible situation representation. Along the bottom of the display 47 the current position of the craft in longitude and latitude can be shown, as well as the date and time. The display can be optionally overlaid with a standard nautical chart.

Each craft being displayed can be represented by an icon 57. The icon can be chosen so that the operator understands what type of craft is being represented. Also, each icon can be shown in its normal, real-time attitude or heading. Thus, for an aircraft display, icons can be shown with one wing down, etc. The icon is also accompanied by an set of information 58 representing that craft. This information can contain the type of craft, flag (for possible language determination), speed, heading, and any other information. In the particular situation display depicted in FIG. 8, the present craft 57 is located near the bottom of the display with a projected track 59 extending along the current heading. Each other craft being displayed also shows a projected track 61 based on current heading. Possible collisions 61 can be marked and a time assigned (14 minutes to collision, etc.) based on the speeds of both craft.

The overall range shown on the display can be controlled by a switch 44 on the display. Also, the type of display, or type of information being displayed can be controlled by a switch 43 or switches on the panel. The display can be changed to different angles of view, etc. because the display is computer generated. A cursor 48 can be used to select icons of interest so that more detailed information about the craft can be displayed. An "Enter" button 52 can be used to make selections off the cursor 48. Collision or what might be called safety status can be displayed by a series of light green 49, yellow 50, or red 51. The system would light one of these lights at all times to quickly show the overall collision situation. A imminent collision would set of an audio alarm 53 that could also be combined with a blinking light.

If the craft wanted to declare an emergency, different types could be selected from switches 55 or menus 56 located on the display. An emergency could then be declared by pushing a button 54 which would transmit it to all other craft. Other craft could be alerted by having their icon of the current craft blink or otherwise notify. Additional information about any selected craft could be displayed somewhere on the display as text 62. FIG. 8 shows this along the top of the display; however, this position is optional. It is important to note that the present invention sends a distress signal regardless of weather, distance from land or other craft. In this respect, the present invention is superior than current methods of using flares, or emergency radio directed only to certain receivers and not the public.

It should be noted that there must be different displays for ships, aircraft, and ground control as well as other possible system users. The present invention envisions the use of several different types of custom displays. For example, a ground control display could have a split screen with possibly three sections. One of the splits could show a top view of an aircraft following an assigned path by a ground controller with a capability to zoom in or out. A second could show the overall or whole assigned path with no zoom capabilities. A third or main display could give a pilot view directly in front of him, taking into consideration as to view distance/height, the position he sits in relation to the ground. On this screen, the ground controller could place by the drag and place method, or other, traffic signs, traffic lights, etc. and or specific instructions such as an arrow pointing in the direction he is to turn, possibly first flashing to prepare for the turn, and then steady to execute the turn. Other instructions in writing could go along with the visual ones in English followed by a secondary language (automatically chosen based on the country of the craft). An example might be "Halt short of runway 270" followed by a translation (Spanish) "Pare corto de la pista 270". The system would choose the secondary language from a preprogrammed table. Ground vehicles could also be participating craft in the ground control system.

A display for an aircraft could show the aircraft in its real flight attitude (perhaps in slight bank to left or right if turning). The background can be the airport layout either ahead or behind for landing or taking off. This display could also be programmed for a top view situation plot. In all displays, restricted or danger zones such as restricted or prohibited airspace, changes to airspace or navigable water through NOTAMS or Coast Guard advisories would also be displayed. Instructions to change course would appear on the display. If the craft continued on into a restricted area, an alert would be sent to other craft, to proper controllers, and would show up on the craft's display.

The present invention could be used to control a missile. A missile would work just like air or water craft. The missile would compute its position by GPS and relay that position to a satellite. The satellite would transmit the position of the missile to a soldier (or operator) who was guiding it. The operator would have a computer such as a laptop along with accessories such as a joystick, mouse, etc. to control the missile. The laptop computer could communicate with the satellite by satellite telephone through any of the system of telephone satellites. Allowances could be made for delays in communication from the computer to the satellite and the satellite to the missile and to the response time of the onboard computer to respond to commands so that corrections could be made in real time. Any correction made by the computer could be translated into a digital coded signal, which when received by the missile's remote flight controls, would be translated to control servos to adjust the proper controls on the missile. A soldier could thus control the missile from anywhere a satellite telephone call is possible. The delay in the system could be measured during a setup period by sending a coded signal to the missile which is then returned to the sender. By timing the delay, the sending system would know how to correct for it.

It should be understood that the illustrations and embodiments herein described are merely illustrative of the present invention. Many other variations and embodiments are within the scope of the present invention.

I claim:

1. A ground control navigation and collision avoidance system comprising: a plurality of aircraft operating on an airport surface, each of said aircraft determining position by GPS and automatically communicating position, heading, and speed data to at least one satellite, said position, heading, and speed data for each of said aircraft being shared with all of said aircraft, each of said aircraft having a situation display depicting said airport with all of said aircraft displayed, said display warning of collision hazards on said airport.

2. The ground control navigation and collision avoidance system of claim 1 further comprising traffic sign icons on said display to direct said aircraft on said airport.

3. The ground control navigation and collision avoidance system of claim 1 further comprising foreign language capability on said display, said display choosing a language based on country of origin of a particular aircraft, said display presenting information and directions in said language.

4. A ground control navigation and collision avoidance system comprising:
   at least one aircraft operating as a ground aircraft at an airport, said aircraft determining its position by a position determination means and automatically communicating position, heading, and speed data to at least one satellite;
   said position, heading, and speed data for said aircraft being shared with other aircraft also operating as ground or air aircraft on or near said airport,
   each of said aircraft having a situation display depicting said airport with all of said aircraft displayed, said display warning of collision hazards on said airport.

5. The ground control navigation and collision avoidance system of claim 4 further comprising traffic sign icons on said display to direct said aircraft on said airport.

6. The ground control navigation and collision avoidance system of claim 4 further comprising foreign language capability on said display, said display choosing a language based on country of origin of a particular aircraft, said display presenting information and directions in said language.

7. The ground control navigation and collision avoidance system of claim 6 further comprising voice commands to and from said display in said chosen language.

8. The ground control navigation and collision avoidance system of claim 4 wherein said position determination means is GPS.

9. The ground control navigation and collision avoidance system of claim 4 wherein said at least one of position, speed and heading is communicated from said satellite to at least on other craft.

10. The ground control navigation and collision avoidance system of claim 4 further comprising communicating at least one of location, speed and heading of said aircraft to a location on said airport.

11. The ground control navigation and collision avoidance system of claim 10 wherein said at least one of position, speed and heading is communicated from said location on said airport to at least on other craft.

12. A airport ground collision avoidance system comprising:

at least one aircraft operating on an airport;

at least one radio link between said aircraft and a satellite;

said aircraft measuring at least one of position, speed and heading using a navigation means;

said aircraft reporting said at least one of position, speed and heading by said radio link to said satellite;

said satellite relaying said at least one of position, speed and heading to other craft on or near said airport.

13. The collision avoidance system of claim 12 wherein said radio link is UHF.

14. The collision avoidance system of claim 12 wherein said navigation means is GPS.

15. The collision avoidance system of claim 12 wherein said navigation means is totally onboard said aircraft.

16. The collision avoidance means of claim 12 wherein heading is determined by an onboard gyro system, position and speed are determined by GPS.

* * * * *